Jan. 23, 1968   R. T. DENYES   3,365,218
HOSE AND CLAMP PREASSEMBLY
Filed Jan. 25, 1965   2 Sheets-Sheet 1

INVENTOR.
Richard T. Denyes
BY
Barnard, McGlynn & Reising
ATTORNEYS

Jan. 23, 1968   R. T. DENYES   3,365,218
HOSE AND CLAMP PREASSEMBLY
Filed Jan. 25, 1965   2 Sheets-Sheet 2

INVENTOR.
Richard T. Denyes
BY
Barnard, McGlynn & Reising
ATTORNEYS

United States Patent Office 3,365,218
Patented Jan. 23, 1968

3,365,218
HOSE AND CLAMP PREASSEMBLY
Richard T. Denyes, 1536 Dorchester,
Birmingham, Mich. 48008
Continuation-in-part of application Ser. No. 269,047,
Mar. 29, 1963. This application Jan. 25, 1965, Ser.
No. 443,733
15 Claims. (Cl. 285—253)

ABSTRACT OF THE DISCLOSURE

A hose and clamp pre-assembly comprising a length of hose having a radially flexible end portion adapted to expand radially upon receiving a fitting therein having an outer diameter greater than the inner diameter of such end portion of the hose, a completely assembled clamp mechanism comprising an annular hose-gripping means extending circumferentially about such end portion of the hose in radially loose relation thereto to permit radial expansion thereof upon receiving such fitting, threaded tightening means operatively connected to such hose-gripping means and being selectively operable to draw such hose-gripping means radially into tight clamping engagement with the end portion of the hose, and means mounting the clamp mechanism on the end portion of the hose in a predetermined preassembled position axially and circumferentially of the hose to retain such clamp mechanism thereon while the preassembly is being handled prior to and during installation on a vehicle or the like, and at the same time properly positioning the clamp mechanism axially of the hose for optimum tight clamping engagement with the fitting received therein and positioning the threaded tightening means circumferentially of the hose to facilitate engagement thereof with a screw driver or the like utilized to tighten the clamp mechanism.

This application is a continuation-in-part of United States application Ser. No. 269,047, filed Mar. 29, 1963, in the name of Richard T. Denyes and now abandoned.

The present invention is specifically directed to a solution of various storage and assembly problems encountered in ultimately providing a fluid tight hose connection between a pair of spaced, fixed fittings of the type employed on automotive vehicles, such as radiator hose connections, hose connections for air-conditioning systems and similar automotive applications. Consequently, reference will be made in the following description specifically to the radiator hose art in order to facilitate an understanding of the structure, function and significance of the invention. However, and as will become quite apparent hereinafter, the present invention may be utilized to advantage in quite different environments.

Referring now to the assembly of automotive radiator hoses by way of example, and as will be readily apparent to those acquainted with such art, it is the typical practice for a hose manufacturer to usually mold or otherwise suitably form a predetermined length of flexible radiator hose for installation on a particular vehicle in accordance with the distance between the engine block and radiator fittings to be placed in fluid communication by the use of such hose, the length of the hose being held to a minimum to save material and cost while being just long enough so that the opposite end portions thereof will project over the respective fittings to a sufficient extent to enable a subsequently installed hose clamp to tightly clampingly engage the hose end portions about such fittings to provide a fluid tight connection. In this regard, the inner diameters of the respective end portions of the hose are somewhat smaller than the outer diameter of the fittings to be received therein whereby it is necessary for such end portions of the hose to expand radially to a certain extent, typically in a range of one-eighth to one-quarter of an inch, upon slipping the hose end portions initially over the ends of the fittings.

Thus, the respective hose and clamp manufacturers deliver their products to automotive plants where numerous separate storage facilities are required in accordance with the number of different types and sizes of hoses and clamps required to be maintained on hand until a need for them may arise, and then similar storage facilities for different hoses and clamps are required on the assembly line when they are to be assembled to a particular vehicle. Thereafter, a hose assembler on the assembly line will selectively pick different hoses and clamps depending upon the particular vehicle involved coming down the assembly line and, as will be apparent, different kinds and models of vehicles are often assembled on the same assembly line, and then proceed to assemble a particular selected hose with particularly selected hose clamps on a given vehicle.

As a typical example of such an assembly operation, in assembling a single radiator hose on a vehicle assembly line, the assembler will first grasp a hose of proper size from one storage area and a pair of clamps from another storage area, assuming that the same size and type of clamp is to be used on opposite ends of the hose as is the usual case, then slide both clamps onto the hose, and then manipulate one of the clamps toward one end of the hose and slip such end of the hose over its associated fitting, followed by tightening the clamp onto the hose and the fitting using a power-driven screw driver or the like. Thereafter, he will shift the other clamp to the other end of the hose to make the other connection in a similar manner. In many instances, one of the clamps is not tightened down at the initial assembly station in which the other clamp is tightened, thereby presenting a problem that the free clamp may slide off the hose while the vehicle is in transit to a subsequent assembly station where it is to be tightened down.

In view of the foregoing, it will, of course, be apparent that it is necessary to provide storage facilities in a given assembly plant for various types and sizes of radiator hoses to be assembled on the different models or makes of vehicles assembled in such plant, and for the various different types and sizes of clamps to be associated with respective ones of such hoses. Similarly, in assembling any given radiator hose, it is necessary for the man on the assembly line to select the proper type and size of hose and clamp or clamps to be associated therewith in accordance with the particular vehicle involved and, apart from the possibility of selecting a wrong size or type of hose or clamp, in the final analysis it is necessary to handle three separate parts as the vehicle moves down the assembly line in assembling each radiator hose, there of course being two such radiator hose and clamp assemblies for each vehicle.

Furthermore, during manipulation of the clamps on the hose during the assembling operation, it is extremely important for the assembly line operator to properly position the clamps at the respective end portions of the hose to insure that, once they are tightened down thereon, a proper fluid tight connection results. Notwithstanding the importance of making this fluid tight connection, due to the press of time available on the assembly line while the various parts are being manipulated, it often happens that one or more of the clamps are canted off the end of the hose or otherwise disposed thereon in such a manner as to result in leakage with obvious deleterious consequences. Contributing to this aspect of the problem with known hose assemblies is the fact that such clamps are very difficult to handle while using the aforementioned power-driven screw driver to perform the clamping operation; that is, the clamp has a tendency to rotate about the axis or body of the hose when engaged with the power-driven screw driver, requiring that the assembly line operator actually grasp the clamp to hold it in position during this operation. Furthermore, and as alluded to above, it often happens that both clamps are not tightened down at the same station at which they are placed on the hose, resulting in the free clamp dropping from the hose while it is in transit to a subsequent station.

In view of the foregoing considerations, it is a principal object and feature of this invention to provide a hose and clamp preassembly comprising a length of hose having one or more clamp mechanisms preassembled thereto whereby a single storage area is required for a given hose and clamp preassembly, the number of parts to be handled in making a hose connection to associated fittings is materially reduced, any danger of selecting the wrong combination of hose and clamps is eliminated, the clamp or clamps are properly prepositioned axially of the ends of the hose relative to the fitting or fittings to be received thereby to facilitate forming a fluid tight joint therebetween, and the typical threaded tightening means of the clamps are held in proper position circumferentially of the hose during the tightening operation using a power-driven screw driver or the like without requiring the assembler to grasp the clamp or clamps at all.

More specifically in this regard, it is a further object and feature of this invention to provide a hose and clamp preassembly comprising, in combination, a hose including a portion which is radially expansible so as to change its outer diameter upon receiving a fitting therein, and an assembled clamp mechanism including annular hose-gripping means and threaded means operatively interconnecting portions of the hose-gripping means to control radial expansion and contraction thereof. The assembled clamp mechanism is axially preassembled onto and completely about the aforementioned portion of the hose in radially loose relation relative thereto. Mounting means are carried by the hose and engageable with the clamp mechanism to hold the latter in a predetermined position on the aforementioned portion of the hose while permitting limited circumferential movement of the hose-gripping means relative to the mounting means upon operating the threaded means of the clamp mechanism to radially contract the latter about the hose. The mounting means holds the clamp mechanism in radially loose preassembled relation relative to the hose to permit radial expansion of the latter upon receiving a fitting therein without operating the threaded means of the clamp mechanism, the threaded means being subsequently operable to radially contract the hose-gripping means of the clamp mechanism about the aforementioned portion of the hose to seal the latter against the fitting received therein.

These and other objects, features and advantages of the invention will appear more fully hereinafter as the description thereof proceeds, reference being made to the drawing in which.

Figure 1:
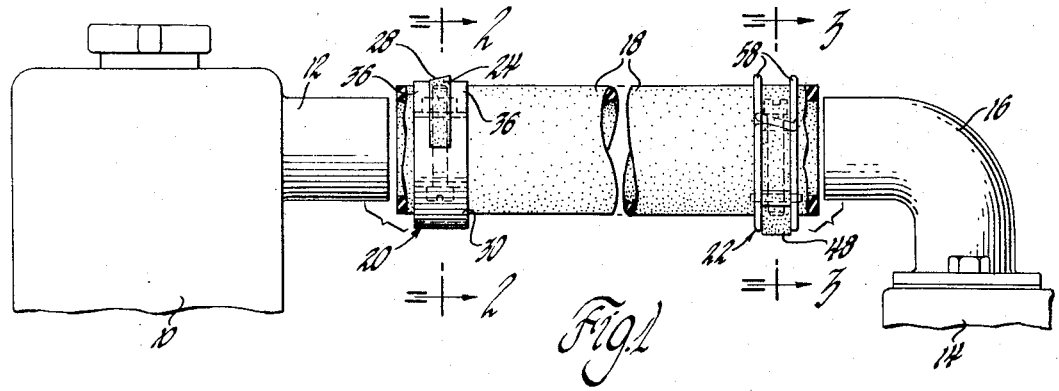
FIGURE 1 is a fragmentary, exploded side elevational view of an automotive radiator hose and clamp preassembly illustrating two preferred embodiments of the present invention.

Referring now to the drawings, and particularly FIGURE 1, there is illustrated by way of example a conventional automotive vehicle radiator 10 having the usual fitting 12 and an engine block 14 having the usual fitting 16 between which the hose 18 is adapted to be assembled using clamp mechanisms indicated generally at 20 and 22, respectively. As indicated in the drawing, and according to conventional practice, the outer diameters of the respective fittings 12 and 16 are somewhat larger than the corresponding inner diameters of the opposite end portions of the hose, whereby the latter are required to expand radially, usually in the order of one-eighth to one-quarter inch, during the initial assembly of the end portions of the hose upon the respective fittings. According to conventional practice, the length of the hose is such relative to the fixed distance between the fittings so that the respective end portions of the hose may be slipped onto the fittings to an extent substantially just sufficient to dispose the clamp mechanisms 20 and 22 radially about portions of the fittings adjacent their respective ends.

Figure 2:
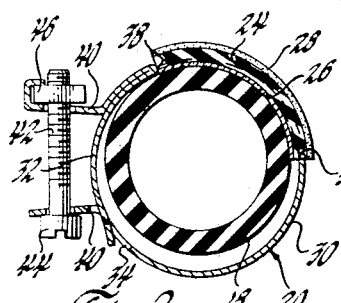
FIGURE 2 is an enlarged, cross sectional view taken on line 2—2 of FIGURE 1 illustrating one of the preferred embodiments of the invention aforementioned.

Referring now particularly to FIGURES 1 and 2 and one preferred embodiment of the invention, one end portion of the hose is provided with a solid, relatively rigid mounting or positioning lug 24 of predetermined, limited circumferential extent which may be molded integrally with, adhesively secured to or otherwise fixed to the hose in any suitable manner so as to project radially therefrom. In this instance, the lug is shown in FIGURE 2 as being adhesively secured or bonded to the hose as indicated at 26. For purposes to appear more fully hereinafter, it may be noted at this juncture that the lug 24 is prelocated a predetermined axial distance from the associated end of the hose and in a predetermined position circumferentially of the latter to preorient the clamp mechanism 20 relative to and to hold it in preassembled relation on the end of the hose. Furthermore, it may be noted that the peripheral surface of the lug includes a ramp surface 28 inclined axially and radially inwardly toward the associated end of the hose.

The clamp mechanism 20 is of conventional, well known and commercially available construction and comprises a band type body member 30 having a finger member 32 struck out of or otherwise formed therefrom and reversely bent so that the free end of the finger member projects through opening 34 in the body member 30 to form, generally speaking, an annular hose-gripping means adapted to extend circumferentially about the associated end portion of the hose. Formation of the finger member 32 from the body member 30 of the clamp mechanism results in the formation in the latter of a pair of axially spaced band-like legs 36 terminating at their circumferentially spaced ends in abutments or shoulders 38 and defining an opening or space therebetween in the body member adapted to receive the lug 24, whereby the side walls of the latter are embraced by the band-like legs 36 and the circumferentially spaced ends thereof closely engage the abutments or shoulders 38. Opposite end portions of the body member of the clamp mechanism terminate in radially projecting ears 40, a conventional threaded screw 42 having a head 44 extending therebetween and receiving a conventional nut 46 whereby, upon threading the screw into the nut, the clamp mechanism will be drawn radially down about the hose 18 and into clamping engagement with the latter and the fitting received therein.

It will now be clear that, due to the location of the mounting or positioning lug 24 in a predetermined position axially and circumferentially of the associated end portion of the hose as aforedescribed and due to the fact that the opening in the clamp mechanism between legs 36 and shoulders 38 closely embraces the axially spaced side walls of the lug and the circumferentially spaced ends thereof, that the clamp mechanism is preoriented axially relative to the end of the hose to result in proper positioning thereof relative to the fitting 12 once the latter is received within the end portion of the hose to insure that a fluid tight joint will result upon tightening the hose clamp down.

In addition, the clamp mechanism is preoriented circumferentially relative to the hose to dispose and hold the head 44 of the screw 42 in an optimum position to receive a power-driven screw driver or the like without requiring the operator thereof to touch the clamp mechanism during the tightening operation. Thus, in FIGURES 1 and 2, the lug 24 cooperates with the clamp mechanism 20 to dispose the screw 42 in its usual tangential position relative to the body member of the clamp mechanism with the screw disposed vertically and the head thereof adapted to be approached from therebeneath, as would be the case when the assembly operation is being conducted from a pit beneath the assembly line. Naturally, ordinarily the screw head would be approached from above when dealing with an upper radiator hose as illustrated in FIGURE 1 and as will appear in connection with the description of the embodiment of FIGURE 3 and from below when dealing with a lower radiator hose, and the foregoing description is merely by way of illustration of the fact that a lug 24 may be positioned on the hose to locate the threaded tightening means of the clamp mechanism for approach with a power-driven screw driver from any direction desired.

It is to be noted at this point that the clamp mechanism 20, after complete assembly thereof including screw 42 and nut 46, is adapted to be preassembled upon the associated end portion of the hose merely by flexing the latter radially inwardly to permit the clamp mechanism to be slipped axially thereon and over the lug 24 into the preassembled position illustrated in FIGURES 1 and 2. The inclined ramp 28 facilitates this axial assembly movement of the clamp mechanism onto the hose, whereby the leading edge of the body member of the clamp mechanism can ride up and over the lug until the legs 36 embrace the latter. Furthermore, it is important to note that the completely assembled clamp mechanism 20 is initially preassembled on the end portion of the hose so as to fit loosely radially thereon as clearly indicated in FIGURE 2. In other words, the diameter of the preassembled clamp mechanism 20 is such relative to the required radial expansion of the end portion of the hose as it is installed on the fitting and as aforedescribed as to permit such expansion without any binding whatsoever. Thus, after such installation, all that is required is to engage the head end of the screw 42 with a power-driven screw driver or the like to thread the screw onto the nut 46 and radially contract the body member 30 of the clamp mechanism into firm clamping engagement with the exterior surface of the hose to clamp the latter against the fitting 12.

Figure 3:
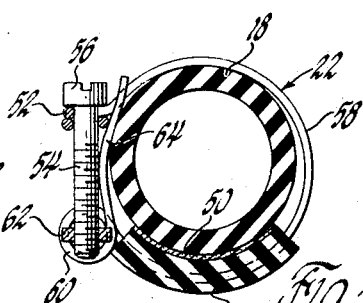
FIGURE 3 is a cross sectional view taken on line 3—3 of FIGURE 1 illustrating the other of the preferred embodiments of the invention aforementioned.

Referring now to FIGURES 1 and 3 and another embodiment of the invention associated with the other end of the hose illustrated in FIGURE 1, a relatively solid, rigid mounting or locating lug 48 of limited circumferential extent is molded integrally with or otherwise suitably secured to the exterior surface of the hose so as to project radially therefrom. In this instance, as in the embodiment shown in FIGURE 2, the lug is indicated as being adhesively secured or bonded as at 50 to the surface of the hose. Again, the clamp mechanism 22 is of a conventional, well known and commercially available construction and is often referred to as a wire-grip hose clamp. Thus, such clamp mechanism is of a type comprising a single piece of wire having its central portion looped, as indicated at 52, around the threaded shank of a screw 54 adjacent the head 56 thereof, axially spaced annular legs 58 extending circumferentially about the hose and embracing axially opposite sides of lug 48, and being respectively looped as indicated at 60 about the respective ends of the usual nut 62 associated with the screw, and terminating in the leg extensions 64 extending beneath the head of the screw between legs 58 so as to result in an annular hose-gripping body member extending circumferentially about the end portion of the hose, with the screw-nut assembly held in tangential relationship relative thereto.

As with the embodiment previously described, the mounting or positioning lug 48 is preoriented relative to its associated end portion of the hose and is received between the legs 58 of the clamp mechanism to properly position the latter axially with respect to the end of the hose for optimum clamping engagement with the latter and the fitting 16 once the latter is received within the hose. In this embodiment, however, the circumferential extent of the lug 48 is less than the circumferential extent of the wire legs 58 between the head 56 of the screw and the wire loops 60 around the nut 62; that is, the clamp mechanism is free to turn to a limited circumferential extent on the hose. On the other hand, the lug is so positioned circumferentially on the hose whereby, upon a power-driven screw driver or the like engaging the head 56 of the screw, the hose clamp may turn only to a limited extent counterclockwise in FIGURE 3 until the wire loops 60 around the nut 62 engage the adjacent end of the lug which then prevents further rotation of the clamp mechanism. As a result, the screw 54 is stopped in a predetermined tangentially extending position circumferentially of the hose for ready access thereto by the operator of the power-driven screw driver. In this instance, the lug 48 is positioned so that the screw 54 will extend substantially vertically on one side of the hose for access vertically downwardly upon the head 56 thereof. Again, it is noted that the assembled clamp mechanism 22 may be axially slipped onto the associated end portion of the hose 18 merely by radially compressing the latter to such an extent as to permit the leading wire leg 58 of the clamp mechanism to pass over the lug 48 until the latter is received in the space between such legs 58. Furthermore, the completely assembled clamp mechanism is pre-assembled on the hose in radially loose relation relative thereto to permit radial expansion of the latter as required in receiving the fitting 16.

As will now be apparent, a particular selected clamp mechanism may be mounted in its predetermined preassembled position on a particular selected hose prior to delivery of the latter to the assembly line and, preferably, prior to delivery of the hose and clamp components of the preassembly to the factory where it is to be used. Thus, it is only necessary to store one preassembly as compared to individual hoses and clamp mechanisms in the factory, and the hose and clamp preassemblies when delivered to the assembly line are ready for installation on vehicles without the assembler being required to select a particular size or type of clamp for a particular hose to go on a particular vehicle, this selection process having already been made during preassembly of the hose and clamp mechanisms. Furthermore, the aforedescribed mounting or positioning lugs positively hold the respective clamp mechanisms on the hose, thereby insuring that they will not drop therefrom during handling.

Thereafter, and during the assembly operation, the assembly line operator merely selects a particular hose and clamp preassembly in accordance with the vehicle involved, slips one end of the hose over its associated fitting, and engages the head of the associated tightening means on the clamp to tighten it down into firm clamping engagement with the hose and the associated fitting without any necessity of grasping the clamp itself. During this tightening operation on one clamp mechanism, the other clamp mechanism is held ready to facilitate clamping engagement with its fitting, whether this clamping operation is done at the same station or at a subsequent station, it being now apparent that such other clamp mechanism will be held on the hose without any danger of its dropping therefrom while the vehicle is in transit to a subsequent station where, as the situation dictates, the second clamp mechanism may be assembled.

Figure 4:
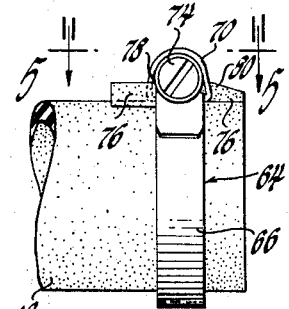
FIGURE 4 is a fragmentary, enlarged side elevational view of an end of a hose illustrating yet another preferred embodiment of the present invention.
Figure 5:
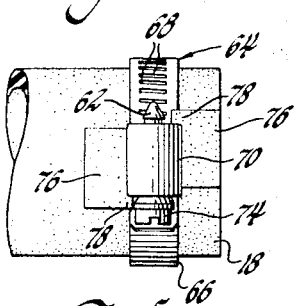
FIGURE 5 is a fragmentary view taken on line 5—5 of FIGURE 4.

Referring now to FIGURES 4 and 5 and another embodiment of the invention in association with another conventional, well known and commercially available type of clamp mechanism 64, the latter comprises the usual annular flat band or strap 66 having the circumferentially spaced slot-like teeth 68 therein with the ends of the band or strap overlapped within a bridge or housing member 70 containing the worm-drive screw 72 having the head 74, the screw engaging in such slot-like teeth 68 whereby, upon rotation of the screw in the proper direction, the band is tightened down about the hose all as will be readily apparent to those acquainted with this art.

In this embodiment, a pair of substantially identical relatively solid radially projecting mounting or positioning lugs 76 are suitably formed or secured on the end of the hose 18 in predetermined axially and circumferentially spaced relation thereto and to each other to form a prelocated saddle therebetween to receive and locate axially opposite sides of the bridge or housing 70 and, hence, the clamp mechanism axially with respect to the end of the hose for the purposes aforementioned. Furthermore, the respective lugs 76 are provided with axially oppositely extending stop members 78 on circumferentially opposite sides of the bridge or housing 70 to positively locate and hold the latter and the head 74 of the associated screw circumferentially of the hose for the purposes aforementioned. The stop members 78 are suitably disposed out of interfering relation with the head 74 of the screw so as not to interfere with engagement of the latter with the power-driven screw driver as aforementioned. The lug 76 located axially closer to the end of the hose includes the axially and radially inwardly inclined ramp face 80 which, together with the radial flexibility of the hose 18, facilitates slipping the assembled band clamp mechanism 64 aforedescribed axially over such lug into the position shown in FIGURES 4 and 5 between such a pair of lugs, thereby properly preassembling the assembled clamp mechanism axially and circumferentially of the hose for the purposes aforementioned. Naturally, the clamp mechanism 64 is preassembled on the hose in loose radial relation relative thereto for the purposes aforedescribed.

Figure 6:
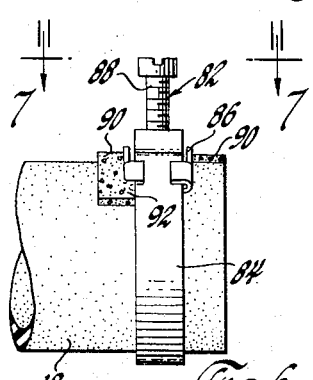
FIGURE 6 is a view corresponding generally to FIGURE 4, but showing yet another preferred embodiment of the present invention.
Figure 7:
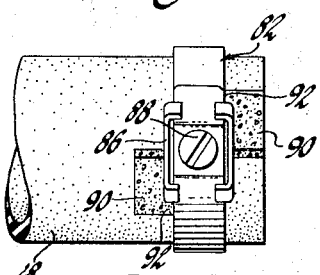
FIGURE 7 is a view taken on line 7—7 of FIGURE 6.

FIGURES 6 and 7 illustrate yet another embodiment of the invention associated with another conventional, well known and commercially available clamp mechanism 82. In this embodiment, the clamp mechanism takes the form of the well known annular flat band or strap 84 having its opposite ends passed through a bridge member or housing 86 and overlapped over the usual nut carried thereby and receiving the screw 88 which also seats in the base of the bridge or housing, all as will be readily apparent to those acquainted with the art, and wherein threading of the screw 88 into the nut results in drawing the band radially upon the hose 18. In this embodiment, the associated end portion of the hose is provided with a pair of radially projecting mounting or positioning lugs 90 generally similar to the lugs 76 previously described in that they are suitably axially and circumferentially spaced relative to each other and the ends of the hose to form a saddle in which the clamp mechanism 82 is mounted in predetermined axially spaced relation with respect to the end of the hose, the respective lugs being provided with axially oppositely projecting stop members 92 located at circumferentially spaced opposite ends of the bridge or housing 86 and engaged with the latter to locate the entire clamp mechanism circumferentially of the hose. In this embodiment, however, at least the lug 90 axially closer to the end of the hose is formed of a bodily radially resilient sponge-like material wherein, without relying substantially on the radial flexibility of the end portion of the hose itself, the assembled clamp mechanism 82 may be slipped axially upon the end of the hose causing the axially outermost lug to be compressed radially until such clamp mechanism slips thereover into the saddle aforementioned. Again, the assembled clamp mechanism is preassembled on the hose in radially loose relation relative thereto, and the respective lugs 90 and their associated stop members 92 serve to properly position the clamp mechanism axially and circumferentially relative to the hose for the purposes aforementioned.

Figure 8:
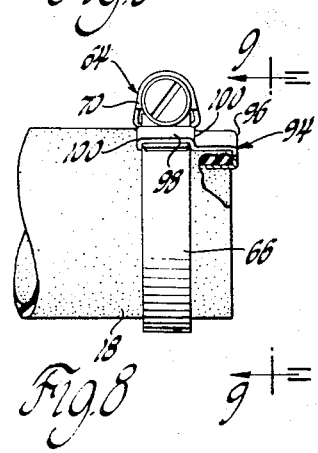
FIGURE 8 is a view corresponding generally to FIGURES 4 and 6, but illustrating yet another preferred embodiment of the invention.
Figure 9:
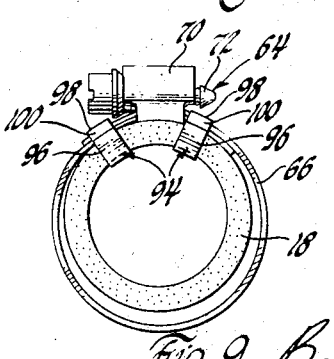
FIGURE 9 is a view taken on line 9—9 of FIGURE 8.

Referring now to the embodiment of FIGURES 8 and 9, there is shown the conventional clamp mechanism 64 previously described with respect to FIGURES 4 and 5, like numerals being employed to indicate parts thereof previously described. In this embodiment, the axial and circumferential mounting or positioning means takes the form of a pair of clips indicated generally at 94, and each of which includes a generally U-shaped end portion 96 adapted to be slipped onto an edge of the hose at the end thereof and to be clamped thereto in circumferentially spaced relation. The main body portion 98 of each clamp extends over the band 66 of the clamp mechanism 64 at opposite ends of the bridge or housing 70 thereof and out of interfering relation with the head end of the screw 72, the main body portion of the clips including axially spaced shoulders 100 embracing the band 66. Thus, in this embodiment, the clamp mechanism 66 is adapted to be slipped upon the hose in radially loose relation relative thereto as aforementioned, and the respective clips 94 then assembled on the hose to properly orient the clamp mechanism axially and circumferentially of the hose for the purposes aforementioned.

Figure 10:
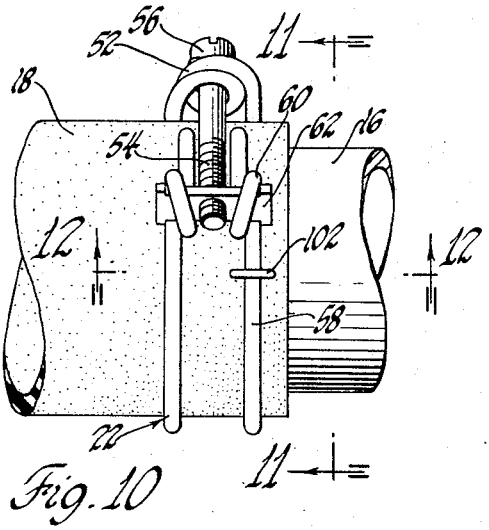
FIGURE 10 is a view corresponding generally to FIGURES 4, 6 and 8, but illustrating still another preferred embodiment of the invention.
Figure 11:
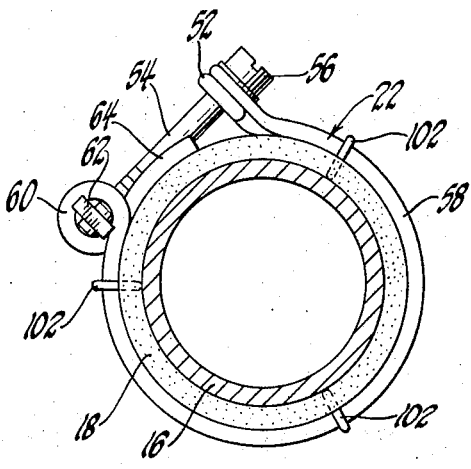
FIGURE 11 is a sectional view taken on line 11—11 of FIGURE 10.
Figure 12:
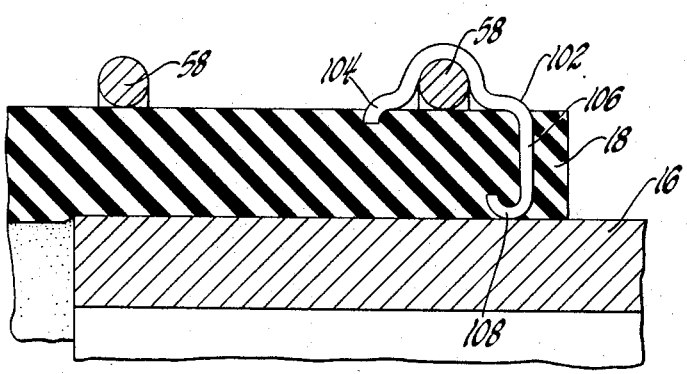
FIGURE 12 is an enlarged fragmentary sectional view taken on line 12—12 of FIGURE 10.

Referring now to the embodiment of FIGURES 10 through 12, there is shown the conventional clamp mechanism, generally shown at 22, previously described with respect to FIGURES 1 and 3, like numerals being employed to indicate parts thereof previously described. In this embodiment, the axial and circumferential mounting or positioning means takes the form of one or more staples 102. The staple 102 has two posts 104 and 106 respectively which engage the hose on opposite sides of one of the legs 58 of the clamp mechanism 22. As is more clearly shown in FIGURE 12, the staple 102 is disposed about a portion 58 of the clamp mechanism 22 with one post 106 piercing through the hose 18 and the second post 104 engaging the hose without piercing therethrough.

Although it is evident that staples having various configurations, i.e., various shaped posts, may be utilized in various positions relative to the clamp mechanism 22 to secure the same to the hose, it has been found preferable to utilize a staple having a long post 106 which pierces the hose and a short post 104 which engages the hose without piercing therethrough. Such a configuration of the staple 102 has been found particularly satisfactory since the long post 106 of the staple may be disposed between the clamp mechanism and the end of the hose. That is to say, the post 106 pierces the hose at a point between the leg 58, which is closest to the end of the hose, and the end of the hose. The disposition of the staple 102 with the long post 106 between the clamp mechanism and the end of the hose prevents leakage between the fitting 16 and the hose 18. The long post 106 of the staple 102 is bent back upon itself forming a loop 108 so as to firmly pierce and re-engage the hose 18. One or more staples 102 mount the clamp mechanism 22 in a predetermined preassembled position axially and circumferentially of the end portion of the hose 18 to facilitate subsequent clamping engagement of the legs 58 with the hose which is disposed about the fitting 16.

Figure 13:
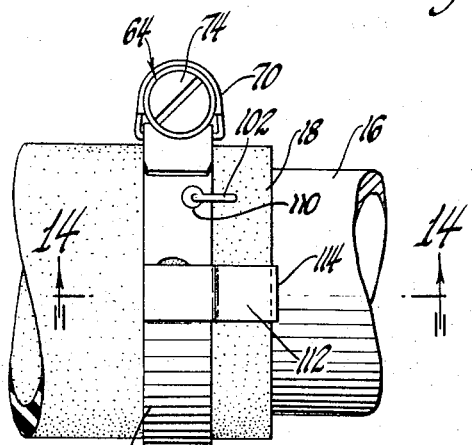
FIGURE 13 is a view corresponding generally to FIGURES 4, 6, 8 and 10, but illustrating still yet another preferred embodiment of the invention.
Figure 14:
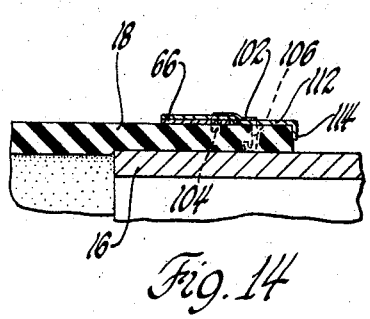
FIGURE 14 is a fragmentary sectional view taken along line 14—14 of FIGURE 13.

Referring now to the embodiment of FIGURES 13 and 14, there is shown the conventional clamp mechanism, generally shown at 64, previously described with respect to FIGURES 4 and 5, like numerals being employed to indicate parts thereof previously described. In this embodiment, the axial and circumferential mounting or positioning means takes the form of one or more staples 102, which was previously described with respect to FIGURES 10 through 12.

The staple 102 is disposed about at least a portion of the clamp mechanism 64 in that the band 66 has an aperture 110 through which staple 102 is disposed. As alluded to with regard to the description of the embodiment shown in FIGURES 10 through 12, the staple 102 may be disposed on either side of the band 66; however, it has been found preferable to dispose the staple 102 such that the long post 106, which pierces the hose 18, is disposed at a point between the band 66 and the end of the hose 18.

The embodiment shown in FIGURES 13 and 14 also includes a means comprising the finger 112 secured to the band 66 to limit the axial movement of the band 66 in a direction away from the end of the hose 18 when the staple 102 has not yet been secured in place. The finger 112 is secured to the band 66 by welding or brazing or the like. The finger 112 extends laterally from the band 66 and has a flange 114 which engages the end of the hose 18 to limit the axial movement of the band as it is placed about the hose 18. The clamp mechanism 64 is disposed circumferentially about and in radially loose relation to the end portion of the hose 18 to permit radial expansion of the hose 18, and the finger 112 secures the clamp mechanism 64 in a predetermined axial position along the hose so that the mounting means, comprising the staple 102, may be placed in position for mounting the clamp mechanism 64 in a predetermined preassembled position axially and circumferentially of the end portion of the hose 18 to facilitate subsequent clamping engagement of the band 66 with the hose.

As alluded to previously, the shape and the relative disposition of the staple 102, as illustrated in FIGURES 10 through 14, is preferred; however, it is to be understood that the staple may take various forms and be disposed in various positions relative to the clamp mechanism.

While several forms of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims which follow.

I claim:

1. A hose and clamp preassembly comprising a length of hose having a radially flexible end portion adapted to expand radially upon receiving a fitting therein having an outer diameter greater than the inner diameter of said end portion of said hose, an annular clamp mechanism including axially spaced members defining an opening therebetween and extending circumferentially about and in radially loose relation to said end portion of said hose to permit radial expansion of the latter, and threaded means operatively connected to said members and being operable to draw the latter radially into clamping engagement with said end portion of said hose, mounting means including at least one staple for mounting said clamp mechanism in a predetermined preassembled position axially and circumferentially of said end portion of said hose to facilitate subsequent clamping engagement of said members therewith and with a fitting therein, said staple having first and second posts, said first post piercing through said hose, said staple disposed about one of said members with said second post engaging said hose on the opposite side of said one of said members from said first post, said first post piercing through said hose at a point between the member closest to the end of said hose and the end of said hose to prevent leakage between said end portion of said hose and said fitting.

2. A hose and clamp preassembly comprising a length of hose having a radially flexible end portion adapted to expand radially upon receiving a fitting therein having an outer diameter greater than the inner diameter of said end portion of said hose, an annular clamp mechanism extending circumferentially about and in radially loose relation to said end portion of said hose to permit radial expansion of the latter, and mounting means for mounting said clamp mechanism in a predetermined preassembled position axially and circumferentially of said end portion of said hose to facilitate subsequent clamping engagement of said clamp mechanism therewith and with a fitting received therein, said mounting means including at least one staple disposed about at least a portion of said clamp mechanism and having at least two posts, said two posts engaging said hose on opposite sides of said portion of said clamp mechanism, one of said posts piercing through said hose, the other of said posts engaging said hose without piercing therethrough, said one of said posts being disposed between said clamp mechanism and the adjacent end of said hose to prevent leakage between said hose and said fitting.

3. The hose and clamp preassembly as defined in claim 2 wherein the portion of said one of said posts which pierces entirely through said hose is bent to re-engage said hose.

4. A hose and clamp preassembly comprising, in combination, a hose including a portion which is radially expansible so as to change its outer diameter upon receiving a fitting therein, an asssembled clamp mechanism including annular hose-gripping means and threaded means operatively interconnecting portions of said hose-gripping means to control radial expansion and contraction thereof, said assembled clamp mechanism being axially preassembled onto and completely about said portion of said hose in radially loose relation relative thereto, and mounting means carried by said hose and engageable with said clamp mechanism to hold the latter in a predetermined position on said portion of said hose while permitting limited circumferential movement of said hose-gripping means relative to said mounting means upon operating said threaded means to radially contract said clamp mechanism, said mounting means holding said clamp mechanism in radially loose relation relative to said portion of said hose to permit radial expansion of the latter upon receiving a fitting therein without operating said threaded means, said threaded means being subsequently operable to radially contract said hose-gripping means about said portion of said hose to seal the latter against such fitting.

5. A hose and clamp preassembly comprising, in combination, a hose including an end portion which is radially expansible so as to change its outer diameter upon receiving a fitting therein, an assembled clamp mechanism including annular hose-gripping means and threaded means at all times operatively interconnecting portions of said hose-gripping means to control radial expansion and contraction thereof, said assembled clamp mechanism being axially preassembled onto and completely about said end portion of said hose in radially loose relation relative thereto, and mounting means carried by said end portion of said hose and engageable with said hose-gripping means of said clamp mechanism to hold the latter in predetermined positions axially and circumferentially of said end portion of said hose while permitting limited circumferential movement of said hose-gripping means relative to said mounting means upon operating said threaded means to radially contract said clamp mechanism, said mounting means holding said clamp mechanism in radially loose relation relative to said end portion of said hose to permit radial expansion of the latter upon receiving a fitting therein without operating said threaded means, said threaded means being subsequently operable to radially contract said hose-gripping means about said end portion of said hose to seal the latter against such fitting.

6. The hose and clamp preassembly as defined in claim 5 wherein said hose-gripping means of said clamp mechanism comprises a pair of axially spaced members defining an opening therebetween, and said mounting means comprising at least one staple disposed about at least one of said members and secured to said hose.

7. The hose and clamp preassembly as defined in claim 6 wherein said staple includes first and second posts, said first post piercing a substantial distance into said hose at a position between said member closest to the end of said hose and the end of said hose, and said second post engaging said hose without piercing a substantial distance thereinto.

8. The hose and clamp preassembly as defined in claim 5 wherein said mounting means comprises at least one mounting clip having an end portion secured to the end of said hose and a body portion extending over said hose-gripping means.

9. A hose and clamp preassembly as defined in claim 5 wherein said mounting means comprises at least one staple.

10. A hose and clamp preassembly as defined in claim 9 wherein said staple has at least two posts, and said posts engage said hose on opposite sides of the portion of said clamp mechanism about which said staple is disposed.

11. A hose and clamp preassembly as defined in claim 10 wherein a first post of said staple pierces through said hose, and the second post of said staple engages said hose without piercing through said hose.

12. A hose and clamp preassembly as defined in claim 11 wherein said first post of said staple is disposed between said clamp mechanism and the adjacent end of said hose to prevent leakage between said hose and said fitting.

13. A hose and clamp preassembly as defined in claim 11 wherein said first post of said staple pierces through and is bent to re-engage said hose, and said first post being disposed between said clamp mechanism and the adjacent end of said hose to prevent leakage between said hose and said fitting.

14. The method of producing a hose and clamp preassembly of the type comprising, in combination, a hose including a portion which is radially expansible so as to change its outer diameter upon receiving a fitting therein and an assembled clamp mechanism including annular hose-gripping means and threaded means operatively interconnecting portions of said hose-gripping means to control radial expansion and contraction thereof; said method comprising the steps of axially installing said assembled clamp mechanism onto and completely about said portion of said hose in radially loose relation relative thereto, and securing mounting means on said hose in engagement with said clamp mechanism to hold the latter in a predetermined position on said portion of the hose while permitting limited circumferential movement of said hose-gripping means relative to said mounting means upon operating said threaded means to radially contract said clamp mechanism, said mounting means holding said clamp mechanism in radially loose relation relative to said portion of said hose to permit radial expansion of the latter upon receiving a fitting therein without operating said threaded means, said threaded means being subsequently operable to radially contract said hose-gripping means about said portion of said hose to seal the latter against such fitting.

15. The method of producing a hose and clamp preassembly of the type comprising, in combination, a hose including an end portion which is radially expansible so as to change its outer diameter upon receiving a fitting therein and an assembled clamp mechanism including annular hose-gripping means and threaded means operatively interconnecting portions of said hose-gripping means to control radial expansion and contraction thereof; said method comprising the steps of axially installing said assembled clamp mechanism onto and completely about said portion of said hose in radially loose relation relative thereto, and securing a staple to said hose in engagement with said clamp mechanism to hold the latter in a predetermined position on said end portion of the hose while permitting limited circumferential movement of said hose-gripping means relative to said mounting means upon operating said threaded means to radially contract said clamp mechanism, said staple holding said clamp mechanism in radially loose relation relative to said end portion of the hose to permit radial expansion of the latter upon receiving a fitting therein without operating said threaded means; said threaded means being subsequently operable to radially contract said hose-gripping means about said end portion of said hose to seal the latter against such fitting.

References Cited

UNITED STATES PATENTS

| | | | |
|---|---|---|---|
| 317,293 | 5/1885 | Buch | 85—49 X |
| 1,012,345 | 12/1911 | Ferguson | 285—8 X |
| 1,282,845 | 10/1918 | Johnson | 85—49 |
| 1,324,316 | 12/1919 | Lewis | 285—253 X |
| 2,186,118 | 1/1940 | Madison | 24—283 X |
| 2,208,706 | 7/1940 | Spencer | 285—253 |
| 2,356,333 | 8/1944 | Matter | 285—236 X |
| 2,533,062 | 12/1950 | Spink | 85—29 X |
| 2,550,186 | 4/1951 | Clamp | 285—8 |
| 2,847,742 | 8/1958 | Oetiker | 24—19 |
| 3,043,612 | 7/1962 | Pablik et al. | 285—236 X |

FOREIGN PATENTS 867,346  5/1961  Great Britain.

CARL W. TOMLIN, Primary Examiner.

THOMAS F. CALLAGHAN, Assistant Examiner.